United States Patent [19]

Tsukamoto

[11] Patent Number: 4,875,433
[45] Date of Patent: Oct. 24, 1989

[54] ILLUMINATION METER DIAL DEVICE

[75] Inventor: Sakae Tsukamoto, Shizuoka, Japan

[73] Assignee: Yazaki Corporation, Japan

[21] Appl. No.: 255,024

[22] Filed: Oct. 7, 1988

[30] Foreign Application Priority Data

Oct. 12, 1987 [JP] Japan .............................. 62-155728[U]

[51] Int. Cl.$^4$ ............................................. G01D 13/18
[52] U.S. Cl. ...................................... 116/335; 116/334
[58] Field of Search ............... 116/279, 286, 287, 295,
116/302, 304, DIG. 28, DIG. 35–DIG. 37,
DIG. 39, 45, 62.1–62.4; 40/452, 551, 576, 615,
616; 362/23, 26; 368/228, 239

[56] References Cited

U.S. PATENT DOCUMENTS

| 2,595,973 | 5/1952 | Neugass | 362/26 |
| 2,664,849 | 1/1954 | Nallinger | 116/62.1 |
| 3,499,417 | 3/1970 | Heinke | 116/335 |

FOREIGN PATENT DOCUMENTS

| 3704574 | 2/1987 | Fed. Rep. of Germany . | |
| 1263414 | 5/1961 | France | 362/26 |
| 62-190416 | 8/1987 | Japan | 116/334 |
| 902260 | 12/1958 | United Kingdom . | |

OTHER PUBLICATIONS

Patent Abstracts of Japan, P 605, Aug. 15, 1987, vol. 11/No. 252.
Geiser et al., PDV-Berichte, Oct. 1977.

Primary Examiner—William A. Cuchlinski, Jr.
Assistant Examiner—W. Morris Worth
Attorney, Agent, or Firm—Wigman & Cohen

[57] ABSTRACT

An illumination meter dial device comprises a transparent base plate (32); a black semitransparent layer (38) coated on the transparent base plate so as to form marks (28 or 30); a black opaque layer (40) coated so as to cover a margin and an outer periphery of the mark formed by the black semitransparent layer (38); and a white semitransparent layer (42) coated so as to cover a margin of the black opaque layer (40) and all over the dial plate except the marks. In the daytime, the marks (28, 30) can be seen in black in contrast with the white dial plate irradiated by sunlight from the outside; in the evening, margins of the marks formed by the black opaque layer (40) not covered by the white semitransparent layer (38) can be seen in black in contrast with the marks and the dial plate irradiated with sunlight from outside and illuminated by the lamp from inside; and in the night, other thick margins of the marks formed by the black opaque layer (40) can be seen in black in contrast with the marks and dial plate illuminated by the lamp from inside.

4 Claims, 2 Drawing Sheets

FIG.4(A) (DAYTIME)  FIG.4(B) (EVENING)  FIG.4(C) (NIGHT)

ILLUMINATION METER DIAL DEVICE

BACKGROUND OF THE INVENTION

1. Field of the Invention

The present invention relates to a dial device for an illumination meter and more specifically to an illumination meter dial device on which black or dark (deep colored) indication marks are recognized in contrast with a white or bright (light colored) dial plate irrespective of when illuminated or not illuminated from inside.

2. Description of the Prior Art

Various meters such as speedmeter, fuel meter, etc. are mounted on automotive vehicles. In these meters, conventionally, the dial is usually made of an opaque material and indication marks such as graduation marks, numerals, characters, etc. are made of a transparent material. In use, the dial is illuminated from the back side of the dial plate so that the transparent indication marks can be seen from the front of the meter.

On the other hand, the same applicant has already disclosed a meter dial such that the dial plate is formed of a dark semitransparent layer and the indication marks are formed of a transparent layer so as to reduce a difference in brightness between the dial plate and the indication marks for prevention of fatigue of driver's eyes (in Japanese Published Unexamined (Kokai) Application No. 62-190416).

Recently, however, there exists a demand for old-fashioned meters provided with a white dial and black indication marks in the accompany with a tendency toward the retrospective request or the simplicity of meters. In the case of the conventional meters of this type, since it is impossible to illuminate the dial plate from the back side of the dial plate, the indication marks are illuminated only from outside at night. In other words, when the white dial is illuminated from inside, it is difficult to recognize the indication marks in contrast with the illuminated white dial plate. In particular, when the dial is illuminated from inside in twilight, since light irradiated upon the dial plate from outside is balanced with that illuminated from inside, there exists a problem in that it is impossible to recognize the indication marks formed on the dial plate in the case of the white dial formed with dark marks.

SUMMARY OF THE INVENTION

With these problems in mind, therefore, it is the primary object of the present invention to provide a novel illumination meter dial device which can improve the indication recognizability in a white or bright (light colored) dial plate formed with black or dark (deep colored) indication marks.

It is another object of the present invention to provide a novel illumination meter dial device in which the dial color can be changed colorfully according to change in ratio of intensity of sunlight irradiated upon the dial plate from outside to light illuminated upon the dial plate by a lamp from inside.

To achieve the above-mentioned object, a dial device for an illumination meter according to the present invention, for indicating marks formed on a dial plate by illuminating the dial plate by a lamp from inside, comprises: (a) a transparent base plate; (b) a black semitransparent layer coated on said transparent base plate so as to form a mark; (c) a black opaque layer coated so as to cover a margin and an outer periphery of the mark formed by said black semitransparent layer; and (d) a white semitransparent layer coated so as to cover a margin of said black opaque layer and all over the dial plate except the mark.

In the dial device according to the present invention, in the daytime, the marks formed by the black semitransparent layer and the black opaque layer not covered by said white semitransparent layer can be seen in black in contrast with the white dial plate irradiated with sunlight from outside; in the evening, a margin of the mark formed by the black opaque layer not covered by the white semitransparent layer can be see in black in contrast with the marks and the dial plate irradiated with the sunlight from outside and illuminated by the lamp from inside; and in the night, another thick margin of the mark formed by the black opaque layer can be seen in black in contrast with the marks and the dial plate illuminated by the lamp from inside.

Further, it is preferable that the dial device further comprises: (a) a first chromatic semitransparent layer formed on an inside surface of the dial plate so as to cover the marks from inside; and (b) a second chromatic transparent layer having a light transmissivity smaller than that of said first chromatic semitransparent layer and formed on the inside surface of the dial plate so as to cover the dial plate except the marks from inside.

Further, when the base plate is a black semitransparent material, it is possible to omit the outer black semitransparent layer.

BRIEF DESCRIPTION OF THE DRAWINGS

The features and advantages of the illumination meter dial device according to the present invention will be more clearly appreciated from the following description of the preferred embodiment of the invention taken in conjunction with the accompanying drawings in which like reference numerals designate the same or similar elements or sections throughout the features thereof and in which:

FIGS. 4(A), (B) and (C) are illuminations for assistance in explaining change in display of an indication mark according to the daytime, the evening and the night.

DETAILED DESCRIPTION OF THE PREFERRED EMBODIMENTS

The illumination meter dial device of the present invention will be described in detail with reference to FIGS. 1 and 2.

Figure 1:
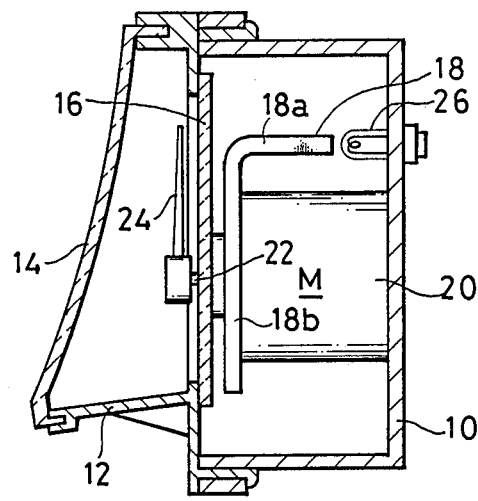
FIG. 1 is a cross-sectional view showing an embodiment of the illumination meter dial device according to the present invention.

In FIG. 1, the illumination meter comprises a rear meter housing 10, a front meter housing 12 attached to the rear meter housing 10, a front glass cover 14 attached to the front meter housing 12, a dial plate 16 fixed to the inner surface of the periphery of the front meter housing 12, a meter movement 20 fixed to the rear housing 10, an indication needle 24 driven by the movement 20 via a needle shaft 22, a light guide member 18 fixed to the movement 20, and an illumination lamp 26 for emitting light into the light guide member 18.

This light guide member 18 guides light emitted from the illumination lamp 26 to under the dial plate 16 so that all over the inside surface of the dial plate can be illuminated from below at illumination intensity as uniformly as possible. The light guide member 18 is composed of a tubular portion 18a and a plate portion 18b, and the inside of the guide member 18 is mirror finished so as to form a mirror reflector.

The needle 24 is rotated by the movement 20 to provide a reading in cooperation with indication marks formed on the dial plate 16. When the illumination lamp 26 is lit up, the light emitted from the lamp 26 is introduced into the light guide member 18, being reflected by the inner mirror reflectors thereof, and illuminates the surface of the dial plate 16 from inside roughly uniformly.

Figure 2:
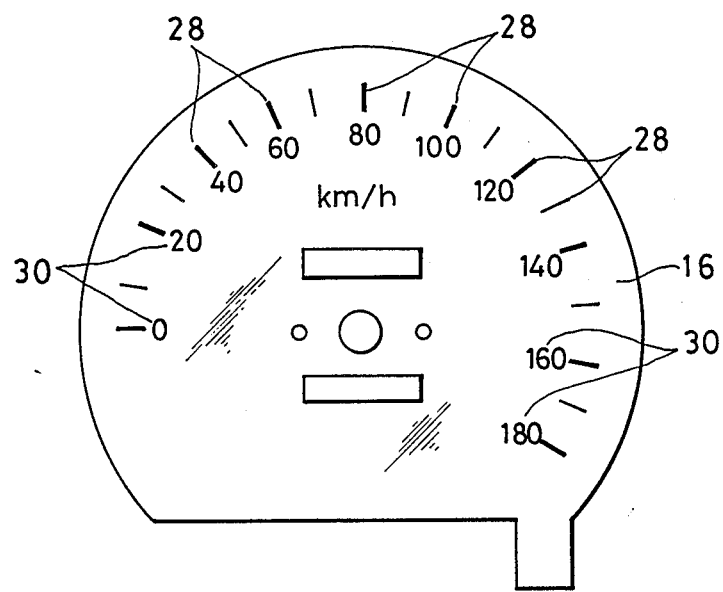
FIG. 2 is a front view showing a dial of the illumination meter dial device according to the present invention.

FIG. 2 shows the dial display formed on the dial plate 16. The dial plate 16 is formed with a number of graduation marks 28 arranged at regular angular intervals in a roughly semicircular shape and a plurality of indication numerals 30 (e.g. vehicle speed indication numerals) also arranged in the inner circumference of the graduation marks 28 at regular angular intervals.

The surface of the dial plate 16 is formed into white or bright (light) color, and the graduation marks 28 and the indication numerals 30 are formed into black or dark (deep) color when illuminated from outside by external light usually. In contrast with this when the illumination lamp 26 is lit up, although the dial plate 16, and the graduation marks 28 and the indication numerals 30 are illuminated from inside, these marks 28 and numerals 30 can be recognized in dependence upon difference in brightness between the dial and the marks or numerals.

Figure 3:
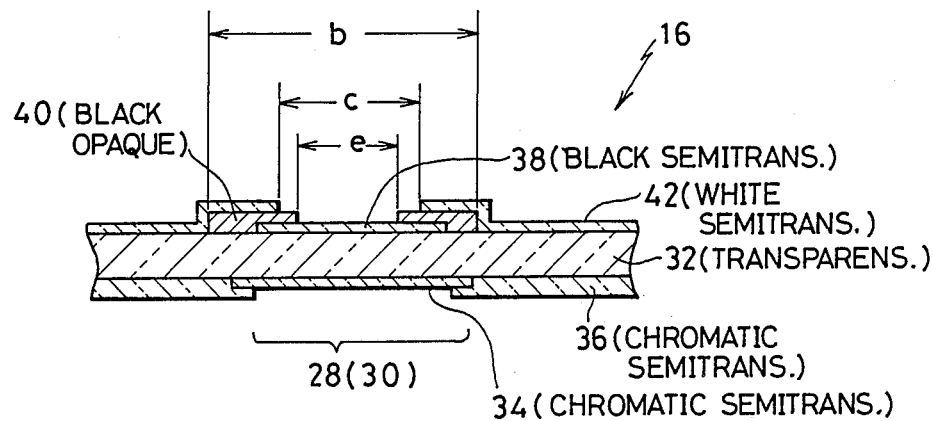
FIG. 3 is an enlarged cross-sectional view showing the dial of the illumination meter dial device according to the present invention.
Figure 3:
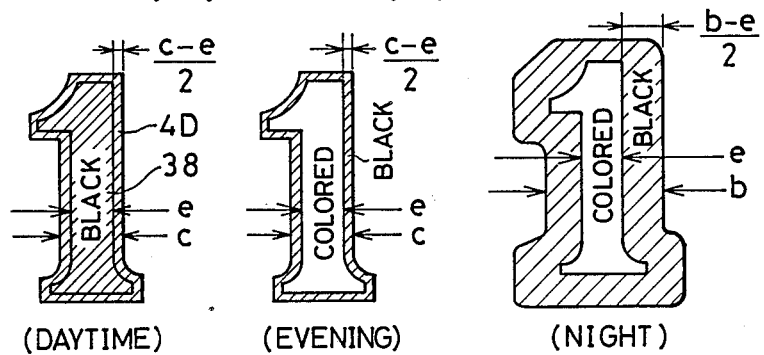

FIG. 3 is an enlarged cross-sectional view showing the dial plate 16 formed with these marks 28 or numerals 30. In FIG. 3, the dial plate 16 is composed of a transparent or semitransparent base material 32 such as polycarbonate, a first inner chromatic (colored) semitransparent layer 34 coated on the inside surface of the dial plate so as to cover areas of a mark 28 or a numeral 30 from inside; a second inner chromatic semitransparent layer 36 having a light transmissivity smaller than that of the first inner chromatic semitransparent layer 34 coated on the inside surface of the dial plate so as to cover the dial plate except the mark 28 or the numeral 30 from inside, an outer black semitransparent layer 38 having a relatively high light transmissivity and coated on the transparent base plate 32 so as to form the mark 28 or the numeral 30, an outer black opaque layer 40 coated so as to cover a margin and an outer periphery of the mark or numeral formed by the black semitransparent layer 38, and an outer white semitransparent layer 42 coated so as to cover a margin of the black opaque layer 40 and all over the dial plate except the mark 28 or the numeral 30.

Here it should be noted that the three outer layers 38, 40 and 42 are overlapped each other as shown in FIG. 3. In more detail, the outer black opaque layer 40 is formed in such a way as to be overlapped with a margin of the outer black transparent layer 38 and cover the outer periphery of the same layer 38 while exposing the layer 38 extending over a width e. The outer white semitransparent layer 42 is formed in such a way as to be overlapped with a margin on the front black opaque layer 40 and cover the outer periphery of the same layer 40 while exposing the layer 40 extending over a width (c−e)/2 on either side thereof.

Therefore, the outer black opaque layer 40 covers the outer black semitransparent layer 38 so as to expose the layer 38 extending over the width e; the outer white semitransparent layer 42 cover the outer black opaque layer 40 so as to expose the layers 38 and 40 extending over the width c. Further, the width of the outer black opaque layer 40 is b in FIG. 3.

In the above-mentioned dial structure, the marks 28 and the indication numerals 30 can be displayed as follows:

(1) In the daytime (lamp is off)

The black or dark mark 28 or numeral 30 can be seen in contrast with the white semitransparent layer 42. In this case, the width of the mark 28 or numeral 30 is c as depicted in FIG. 4(A), because the two outer layers 38 and 40 are both black in contrast with the outer white layer 42.

(2) In the evening (lamp is on)

On the dial, the illumination light is transmitted through the inner chromatic semitransparent layer 36, the transparent or semitransparent base material 32 and the outer white semitransparent layer 42, so that the dial plate is illuminated from inside. In this case, since the illumination light is transmitted through the second inner chromatic semitransparent layer 36, the transparent base material 32, and the outer white semitransparent layer 42, and therefore attenuated according to the respective transmissivity of these layers 36, 32 and 42, the dial surface is colored into a color determined by wavelengths absorbed by these layers 36, 32 and 42.

In the evening, since the illumination light colored through these layers 36, 32 and 42 is mixed with external sunlight reflected from the outer white semitransparent layer 42 and further the external sunlight intensity changes every moment, the color on the dial also changes every moment according to the mixture ratio of the external sunlight reflected from the dial and the internal illumination light transmitted through the dial as the external sunlight intensity decreases.

On the other hand, on the mark 28 or numeral 30 since the illumination light is transmitted through the first inner chromatic semitransparent layer 34, the transparent base material 32, the outer black semitransparent layer 38, and therefore attenuated according to the respective transmissivity of these layers 34, 32, and 38, the mark 28 or numeral 30 is also colored into a color determined by wavelengths absorbed by these layers.

Therefore, in the evening, since both the mark 28 or numeral 30 and the dial 16 are colored, there exists a moment when the intensity of light reflected from and transmitted through the outer black semitransparent layer 38 is almost equal to that reflected from and transmitted through the outer white semitransparent layer 42, and therefore it is difficult to distinguish the mark 28 or numeral 30 from the dial 16.

In this moment, however, since the outer black opaque layer 40 formed between the outer white semitransparent layer 42 and the outer black transparent layer 38 becomes distinguishable as shown in FIG. 4(B), the margin or contour (c−e)/2 of each of the marks 28 and the numerals 30 is well distinguishable in black and the mark or the numeral with a width e can be seen in a color.

(3) In the night (lamp is on)

Since the illumination light is transmitted through the first inner chromatic semitransparent layer 34 and the outer black semitransparent layer 38, the mark 28 or numeral 30 is illuminated from inside. On the other hand, since the illumination light is transmitted through the second inner chromatic semitransparent layer 36 and the outer white semitransparent layer 42, the dial 16 is also illuminated. However, since the outer black opaque layer 40 is provided, the margin or contour (b−e)/2 of each of the marks 28 and the numerals 30 is well distinguishable in black and the mark or the numeral with a width e also can be seen in a color as shown in FIG. 4(C).

In the above embodiment, although the outer black semitransparent layer 38 is formed at the marks 28 and numerals 30, when the base material 32 is a black semitransparent material and therefore the first inner chromatic semitransparent layer 34 is not seen from outside, this layer 38 can be emitted.

As described above, in the illumination meter dial device according to the present invention, in the daytime, the dial surface is illuminated by the external sunlight in white color and the marks and numerals are seen in black color, thus realizing an old-fashioned dial display. In the evening, when the illumination lamp is lit up, the illumination light is transmitted through the marks and numerals and the external sunlight is reflected from the dial surface, or the illumination light transmitted through both the marks or numerals and the dial is mixed with the external sunlight reflected from both the marks or numerals and the dial. Therefore, the display color changes on the marks and the dial according to the ratio of the transmitted light to the reflected light.

Further, when the transmitted light is roughly equal to the reflected light on the marks and the dial, the contour (c−e)/2 of the mark or numeral is distinguishable due to the presence of the outer black opaque layer 40 and the outer white semitransparent layer 42.

Further, in the night, although the marks or numerals and the dial are both illuminated by the illumination light, the margin or contour (b−e)/2 of the mark or numeral is distinguishable due to the presence of the outer black opaque layer 40 or the difference in brightness between the marks or numerals and the dial.

In summary, in this dial device, the color changes at both the marks or numerals and the dial according to the ratio of the external sunlight reflected therefrom and the illumination light transmitted there through.

What is claimed is:

1. A dial device for an illumination meter, for indicating marks formed on a dial plate by illuminating the dial plate by a lamp from inside, comprising:
   (a) a transparent base plate;
   (b) a black semitransparent layer coated on said transparent base plate so as to form a mark;
   (c) a black opaque layer coated so as to cover a margin and an outer periphery of the mark formed by said black semitransparent layer; and
   (d) a white semitransparent layer coated so as to cover a margin of said black opaque layer and all over the dial plate except the mark.

2. The dial device for an illumination meter of claim 1, wherein in the daytime, the mark formed by the black semitransparent layer and the black opaque layer not covered by said white semitransparent layer can be seen in black in contrast with the white dial plate irradiated with sunlight from outside; in the evening, a margin of the mark formed by said black opaque layer not covered by said white semitransparent layer can be seen in in black in contrast with the marks and the dial plate irradiated with sunlight from outside and illuminated by the lamp from inside; and in the night, another thick margin of the mark formed by the black opaque layer can be seen in black in contrast the marks and the dial plate illuminated by the lamp from inside.

3. The dial device for an illumination member of claim 1, which further comprises:
   (a) a first chromatic semitransparent layer formed on an inside surface of the dial plate so as to cover the marks from inside; and
   (b) a second chromatic transparent layer 36 having a light transmissivity smaller than that of said first chromatic semitransparent layer and formed on the inside surface of the dial plate so as to cover the dial plate except the marks from inside.

4. A dial device for an illumination meter, for indicating marks formed on a dial plate by illuminating the dial plate from inside, comprising:
   (a) a black transparent base plate;
   (b) a black opaque layer coated on said black transparent base plate so as to form a constant width margin of the mark; and
   (c) a white semitransparent layer coated so as to cover a margin of said black opaque layer and all over the dial plate except the mark.

* * * * *